Sept. 18, 1934.   M. B. POLLOCK   1,974,366
FIGURE TOY
Filed June 20, 1932
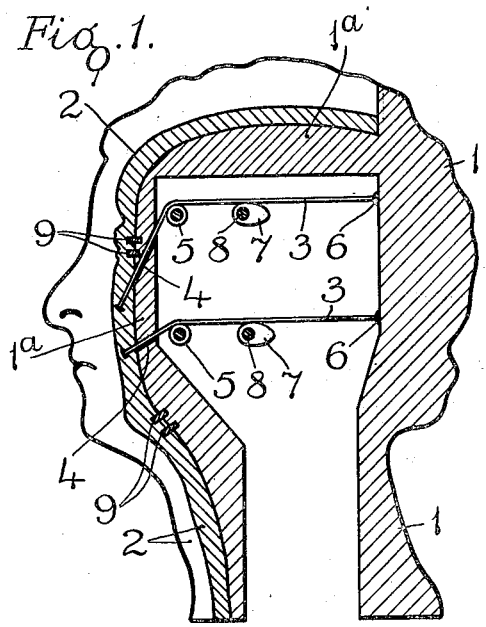
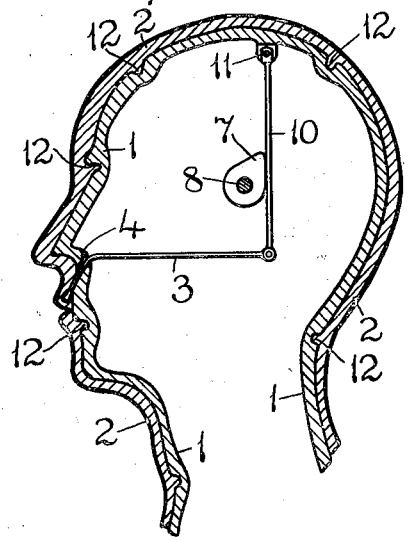
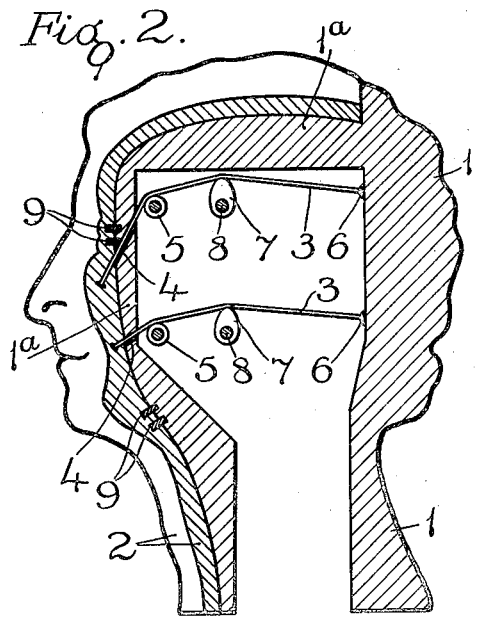
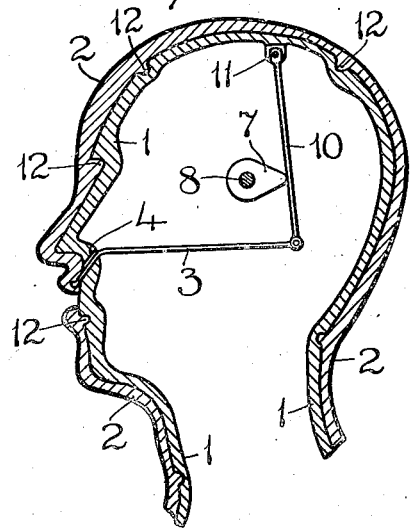
INVENTOR
Mary B. Pollock
By
ATTORNEY

UNITED STATES PATENT OFFICE 1,974,366

FIGURE TOY

Mary Beatrice Pollock, London, England

Application June 20, 1932, Serial No. 618,355
In Great Britain June 29, 1931

1 Claim. (Cl. 46—40)

This invention relates to figure toys of human figures, animals or the like or parts thereof, such as the head, used for exhibition purposes, advertising toys, display purposes or otherwise and has for its object to construct such class of articles with means whereby certain movements can be given to the surface or part of the surface to simulate every facial expression or movement which is possible in actual life, or any of them separately, such as for instance in a model of a human head—smiling, crying, moving the lips as in talking, raising the brows or other natural or grotesque facial expressions.

According to this invention, I construct a hollow body member of hard or rigid material and on the whole or part of same I apply a continuous or uninterrupted covering of flexible or resilient material, which is flesh like in respect to both consistency and color, and has no joints, and which is shaped or moulded on the outside to form the model or the figure required. In connection with same I employ means secured in the flexible or resilient material at suitable points, by inserting same into the flexible material before the flexible material sets, and then passing same through apertures in the hollow member, and such means are manually or mechanically operated to draw up, expand or otherwise move the flexible or resilient material to give various effects exactly as in life. Interengaging anchor means may be provided on the hollow member and the flexible or resilient material to limit or resist the movement of the material at the points required.

The invention will be clearly understood from the following description aided by the accompanying drawing showing two examples of carrying the invention into effect and in which:—

Figure 1 is a sectional view, more or less diagrammatic, of a model of a human head with the features in repose and showing one example of the invention applied, the section being on a vertical line taken approximately at the outer corner of the left eye.

Figure 2 is a view substantially similar to Figure 1 with the features moved to simulate smiling.

Figure 3 is a vertical section of a model of a human head showing a modified example of the invention with the features in repose.

Figure 4 is a view substantially similar to Figure 3 with the upper lip raised.

The invention can be carried into effect in a variety of ways, and as one example applied to a representation of a human head and to simulate smiling, and as illustrated in Figures 1 and 2 of the accompanying drawing, I construct a hollow member 1 of rigid material shaped at the back to represent the back of a head and neck, and the other parts of the member 1 are roughly shaped to form a rigid base 1ª for the top of the head, face and neck and on such portion 1ª I secure a covering of flexible or resilient material 2 such as india-rubber composition shaped to represent in one continuous material the whole of a human face and neck without joints or cracks. At suitable points in the flexible material 2, I secure inclined or angularly disposed ends of flexible draw elements like lengths of inextensible material 3, 3, such as webbing, catgut or other cords or bands, preferably by inserting these ends into the flexible material the same is cooked or vulcanized. Said draw elements 3 pass through inclined holes or openings 4, 4 to the inside of the hollow member 1 where they pass over small pulley wheels or rollers 5, 5 and are anchored to the opposite side of the hollow member 1 at 6, 6.

Any number of cords or bands 3 may be employed, according to the effect required such as for instance one for each of the smiling muscles in the human face.

In the hollow member 1 and under each cord or band 3 is provided a cam 7, 7 or equivalent mounted on suitable cross-shafts 8, 8 and positioned in engagement with the cords or bands 3, 3, and such cross-shafts 8, 8 and cams 7, 7 may be revolved by hand, but preferably a suitable motive power is incorporated, such as a clockwork or electric motor, and such motor may be positioned in the hollow member 1 or below same to drive the cross-shafts and cams through endless bands, cords or chains passing up through the hollow neck or otherwise.

Pins or projections 9 may be secured to the hollow member 1 projecting into the flexible or resilient composition 2 to prevent movement of parts not required to move.

In the modification shown in Figures 3 and 4 I form the hollow member 1 of metal or other hard material and cover the whole of the face, head and neck with the flexible material 2 and instead of anchoring the ends of the cords or bands 3 to the back of the head 1, I connect each cord or band 3 to a lever 10, pivotally suspended from a lug 11 or equivalent, the lever 10 or levers being engaged and acted upon by the cams 7.

In these figures I have only shown one cord or band 3 connected to the upper lip, but it will be understood that other bands, levers and cams may be incorporated to obtain the effect desired.

12 are recesses in the hollow member 1 in which the flexible material 3 engages to anchor same to the hollow member 1 at those places at which no movement takes place and are alternative to the pins 9 shown in Figures 1 and 2.

The head may be colored life like or in monochrome to represent marble or bronze or other material and a wig, false eyes, teeth or other adornments can be applied.

In action the cross-shafts 8, 8 and cams 7, 7 are revolved and the cams 8, 8 draw either on the cords or bands 3 (Figures 1 and 2) to bend same to shorten the distance between their fixed ends 6, 6 and the ends in the composition, or (Figures 3 and 4) press on the lever 10 to pull on the cords or band 3 and thus pull on the flexible surface of the face, acting like the smiling muscles in life and widening the mouth and lifting the cheeks so as to pull the flexible surface 2 up to bulge the same below the eyes. The pins 9 or projections or recesses 12 limit the extent of surface movement and stop it below the level of the mouth and above the level of the eye sockets or elsewhere as desired.

Various other movements or expressions can be given by arranging the cords or bands accordingly.

Instead of or in addition to the bands or cords 3 I may employ hooks, rods, pins, wedges or equivalent, manually or mechanically operated to move the flexible surface. These hooks, rods, pins, wedges or equivalent are operated from inside the hollow member, and may be arranged and actuated so as to push out the surface or other parts of the flexible surface, such as the tongue, lips or nose or other part or parts, and also to pull them inwards and upwards, downwards and laterally either way.

I have not described or illustrated any particular means for rotating the shafts 8 and cams 7 as any suitable form of motive power, either mechanized or manual can be employed.

What I do claim as my invention and desire to obtain by Letters Patent is:—

In a device of the class described, a body member of self-sustaining form, an elastic covering disposed over a portion of said body member, said body member having an opening in the wall thereof, a flexible draw element passing through said opening having an end anchored in the covering, said element entering the covering at the inner surface thereof and extending a distance from said inner surface toward the outer surface to insure distortion of the outer surface through the drawing of said element and integral projections and recesses on the body member and covering interfitting with each other so as to restrict the zone of the covering which is subject to distortion through the drawing of said element.

MARY BEATRICE POLLOCK.